United States Patent
Kim et al.

(10) Patent No.: US 10,217,985 B2
(45) Date of Patent: Feb. 26, 2019

(54) SEPARATOR FOR LITHIUM SECONDARY BATTERY, LITHIUM SECONDARY BATTERY USING THE SEPARATOR, AND METHOD OF MANUFACTURING THE LITHIUM SECONDARY BATTERY

(71) Applicant: SAMSUNG SDI CO., LTD., Yongin-si, Gyeonggi-do (KR)

(72) Inventors: Ihn Kim, Yongin-si (KR); Youngsu Kim, Yongin-si (KR); Yunkyung Jo, Yongin-si (KR); Narae Park, Yongin-si (KR); Jungjin Moon, Yongin-si (KR); Seungjun Min, Yongin-si (KR); Sunggwi Ko, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 534 days.

(21) Appl. No.: 14/788,509

(22) Filed: Jun. 30, 2015

(65) Prior Publication Data

US 2016/0049628 A1    Feb. 18, 2016

(30) Foreign Application Priority Data

Aug. 13, 2014 (KR) .................. 10-2014-0105425

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/168* (2013.01);
(Continued)

(58) Field of Classification Search
CPC ............. H01M 2/1686; H01M 10/052; H01M 10/0587; H01M 10/058; H01M 10/0525;
(Continued)

(56) References Cited

U.S. PATENT DOCUMENTS 4,973,532 A    11/1990 Taskier et al.
9,941,497 B2    4/2018 Toyoda et al.
(Continued)

FOREIGN PATENT DOCUMENTS

KR    10-2006-0003665 A    1/2006
KR    10-0754746 B1    9/2007
(Continued)

OTHER PUBLICATIONS

EPO Search Report dated Dec. 10, 2015, for corresponding European Patent application 15180828.4, (6 pages).
(Continued)

*Primary Examiner* — Michael L Dignan
(74) *Attorney, Agent, or Firm* — Lewis Roca Rothgerber Christie LLP

(57) ABSTRACT

A separator includes a porous base, and a first coating layer on a surface of the porous base, the first coating layer including a (meth)acrylic acid ester-based polymer having a glass transition temperature of about 10° C. to about 60° C. The first coating layer may be positioned opposite to a cathode of the lithium secondary battery. The separator may further include a second coating layer on a surface of the porous base opposite to the first coating layer and comprising a (meth)acrylic acid ester-based polymer.

12 Claims, 2 Drawing Sheets

(51) Int. Cl.
  *H01M 10/0525* (2010.01)
  *H01M 10/058* (2010.01)
  *H01M 10/052* (2010.01)
  *H01M 10/0587* (2010.01)

(52) U.S. Cl.
  CPC ....... *H01M 2/1646* (2013.01); *H01M 2/1653* (2013.01); *H01M 10/052* (2013.01); *H01M 10/058* (2013.01); *H01M 10/0525* (2013.01); *H01M 10/0587* (2013.01); *H01M 2/166* (2013.01); *Y02T 10/7011* (2013.01)

(58) Field of Classification Search
  CPC .. H01M 2/168; H01M 2/1653; H01M 2/1646; H01M 2/145; H01M 2/166; Y02T 10/7011
  See application file for complete search history.

(56) References Cited

U.S. PATENT DOCUMENTS

| | | | |
|---|---|---|---|
| 10,153,473 B2 | 12/2018 | Miyazawa et al. | |
| 2006/0008700 A1* | 1/2006 | Yong | H01M 2/145 |
| | | | 429/144 |
| 2009/0136848 A1 | 5/2009 | Minami et al. | |
| 2009/0142657 A1 | 6/2009 | Yen | |
| 2009/0208840 A1 | 8/2009 | Ogasawara et al. | |
| 2010/0323230 A1* | 12/2010 | Lee | H01M 2/166 |
| | | | 429/143 |
| 2012/0202104 A1 | 8/2012 | Han et al. | |
| 2013/0084483 A1 | 4/2013 | Lee et al. | |
| 2013/0209861 A1 | 8/2013 | Yong et al. | |
| 2015/0270523 A1* | 9/2015 | Toyoda | H01M 2/145 |
| | | | 429/145 |

FOREIGN PATENT DOCUMENTS

| | | |
|---|---|---|
| KR | 10-0758482 | 9/2007 |
| KR | 10-2008-0023731 A | 3/2008 |
| KR | 10-2008-0110817 | 12/2008 |
| KR | 10-2009-0083854 A | 8/2009 |
| KR | 10-1020325 | 2/2011 |
| KR | 10-2012-0089551 | 8/2012 |
| KR | 10-2012-0114142 | 10/2012 |
| KR | 10-2012-0127059 | 11/2012 |
| WO | WO 2008/108583 A1 | 9/2008 |
| WO | WO 2013/151144 A1 | 10/2013 |
| WO | WO 2014/017651 A1 | 1/2014 |
| WO | WO 2014/050708 A1 | 4/2014 |

OTHER PUBLICATIONS

EPO Office Action dated Mar. 5, 2018, for corresponding European Patent Application No. 15180828.4 (5 pages).

EPO Summons to attend oral proceedings, dated Nov. 15, 2018, for corresponding European Patent Application No. 15180828.4 (5 pages).

Japanese Office Action dated Jan. 4, 2019, for corresponding Japanese Patent Application No. 2015-051918, 3 pages.

* cited by examiner

SEPARATOR FOR LITHIUM SECONDARY BATTERY, LITHIUM SECONDARY BATTERY USING THE SEPARATOR, AND METHOD OF MANUFACTURING THE LITHIUM SECONDARY BATTERY

CROSS-REFERENCE TO RELATED APPLICATION

This application claims priority to and the benefit of Korean Patent Application No. 10-2014-0105425, filed on Aug. 13, 2014, in the Korean Intellectual Property Office, the entire content of which is incorporated herein by reference.

BACKGROUND

1. Field

One or more embodiments of the present disclosure relate to a separator for a lithium secondary battery, a lithium secondary battery including the separator, and a method of manufacturing the lithium secondary battery including the separator.

2. Description of the Related Art

Lithium secondary batteries are high voltage and high energy density batteries, and thus have applications in a wide variety of fields. For example, electric vehicles, including hybrid electric vehicles (HEVs) and plug-in-electric vehicles (PHEV), operate at high temperatures, have long-term usability, and are able to charge or discharge a large amount of electricity, and thus require lithium secondary batteries having high-discharge capacity and improved lifetime characteristics.

A lithium secondary battery may be assembled by positioning a separator between a cathode and an anode. The separator may serve as a path for ions in the lithium secondary battery, and may directly contact the cathode and the anode to prevent a short circuit between the cathode and the anode.

Using a separator having a surface coated with an adhesive polymer to improve the binding strength to the cathode and anode may further simplify the manufacturing process of lithium secondary batteries.

However, the adhesive polymer may also block the pores of the separator, and thus may reduce air permeability of the separator and mobility of lithium ions, and consequentially may lower the performance of the lithium secondary battery. In addition, the surface of the separator coated with the adhesive polymer may be so sticky that the separator may adhere to itself, and therefore it may be difficult to roll or unroll the separator.

SUMMARY

One or more embodiments of the present disclosure are directed to a separator for a lithium secondary battery, the separator having improved binding strength to electrodes.

One or more embodiments of the present disclosure are directed to a lithium secondary battery including the separator and having improved charge-discharge efficiency and capacity retention rate.

One or more embodiments of the present disclosure are directed to a method of manufacturing the lithium secondary battery.

Additional aspects will be set forth in part in the description which follows and, in part, will be apparent from the description, or may be learned by practice of the presented embodiments.

According to one or more embodiments of the present disclosure, a separator for a lithium secondary battery includes a porous base and a first coating layer on a surface of the porous base. The first coating layer may include a (meth)acrylic acid ester-based polymer having a glass transition temperature of about 10° C. to about 60° C.

The first coating layer of the separator may be positioned opposite to a cathode of the lithium secondary battery.

The (meth)acrylic acid ester-based polymer may have a glass transition temperature of about 20° C. to about 60° C.

The first coating layer may be a dot-patterned layer including a plurality of dots arranged at intervals.

The plurality of dots may have an average diameter of about 0.1 mm to about 1 mm and an average thickness of about 0.3 μm to about 10 μm, and at least one of the intervals between the dots may be about 0.1 mm to about 10 mm.

The separator may further include a second coating layer on a surface of the porous base opposite to the first coating layer and including a (meth)acrylic acid ester-based polymer.

The second coating layer may be a dot-patterned layer including a plurality of dots arranged at intervals.

The plurality of dots of the second coating layer may have an average diameter of about 0.1 mm to about 1 mm and an average thickness of about 0.3 μm to about 10 μm, and at least one of the intervals between the dots may be about 0.1 mm to about 10 mm.

The separator may further include an inorganic coating layer between the porous base and the second coating layer, the inorganic coating layer including inorganic particles of at least one selected from colloidal silica, α-alumina (α-$Al_2O_3$), γ-alumina (γ-$Al_2O_3$), boehmite (γ-AlO (OH)), gibbsite (γ-Al $(OH)_3$), zirconium oxide, magnesium fluoride, $BaTiO_3$, $SnO_2$, $CeO_2$, MgO, NiO, CaO, ZnO, $Y_2O_3$, $TiO_2$, SiC, and combinations thereof.

The separator may further include an inorganic coating layer between the porous base and the first coating layer, the inorganic coating layer including inorganic particles of at least one selected from colloidal silica, α-alumina (α-$Al_2O_3$), γ-alumina (γ-$Al_2O_3$), boehmite (γ-AlO (OH)), gibbsite (γ-Al $(OH)_3$), zirconium oxide, magnesium fluoride, $BaTiO_3$, $SnO_2$, $CeO_2$, MgO, NiO, CaO, ZnO, $Y_2O_3$, $TiO_2$, SiC, and combinations thereof.

The (meth)acrylic acid ester-based polymer may include a polymerization product between an ethylenically unsaturated carboxylic acid ester and a monomer that is copolymerizable with the ethylenically unsaturated carboxylic acid ester.

The first coating layer and the second coating layer may include the same (meth)acrylic acid ester-based polymer.

According to one or more embodiments of the present disclosure, a lithium secondary battery includes a cathode; an anode; and any of the separators according to the above-described embodiments.

According to one or more embodiments of the present disclosure, a method of manufacturing a lithium secondary battery includes forming a battery assembly that includes a cathode, an anode, and any of the separators according to the above-described embodiments; rolling up or stacking the battery assembly to obtain a rolled or stacked battery assembly; heat-pressing the rolled or stacked battery assembly at a temperature of about 80° C. to about 120° C. to obtain a combined battery assembly; and impregnating the combined battery assembly with an electrolyte.

The separator for the lithium secondary battery may be obtained by coating an aqueous emulsion including a (meth)

acrylic acid ester-based polymer on a surface of a porous base and drying the coated (meth)acrylic acid ester-based polymer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
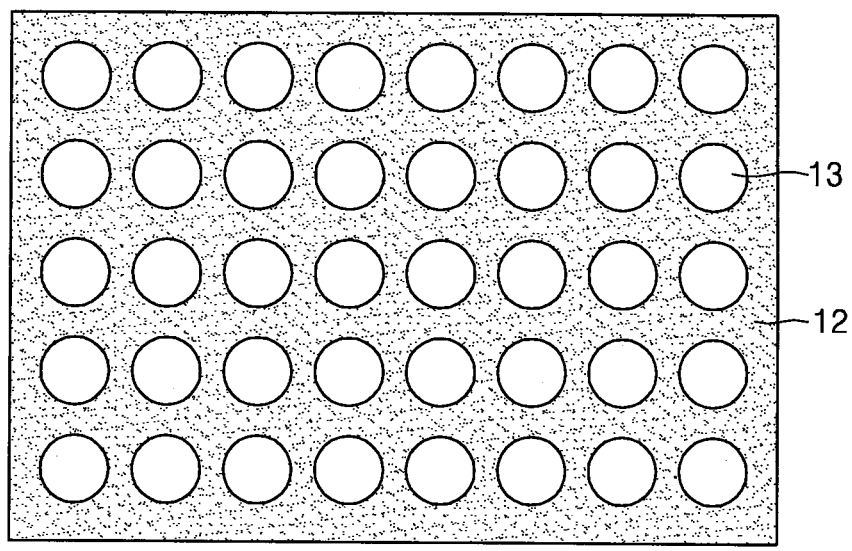
FIG. 1 is a sectional schematic view of a first coating layer of a separator according to some embodiments of the present disclosure.

Reference will now be made in detail to embodiments, examples of which are illustrated in the accompanying drawings, wherein like reference numerals refer to like elements throughout. However, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the listed elements. Expressions such as "at least one of," when preceding a list of elements, modify the entire list of elements and do not modify the individual elements of the list. Further, the use of "may" when describing embodiments of the present invention refers to "one or more embodiments of the present invention." The term "(meth)acrylate" may refer to acrylates and/or methacrylates. In addition, as used herein, the terms "use," "using," and "used" may be considered synonymous with the terms "utilize," "utilizing," and "utilized," respectively.

Hereinafter, exemplary embodiments of a separator for a lithium secondary battery, a lithium secondary battery including the separator, and a method of manufacturing the lithium secondary battery will be described.

In a comparative related art separator for a lithium secondary battery, a coating layer may include an adhesive polymer having a glass transition temperature at or below room temperature (about 25° C.), for example, at about −15° C., and thus, the coating layer may have a sticky surface. Accordingly, when the separator is a rolled separator known to those skilled in the art, the stickiness of the coating layer may cause the separator to stick to itself and may prevent the separator from being properly rolled up. To mitigate the stickiness of the coating layer, a release layer may be attached to the coating layer. However, attaching such release layer may require an additional process of laminating the release layer, which may increase battery manufacturing costs. In addition, a low glass transition temperature of the adhesive polymer in the coating layer may cause the particles of the adhesive polymer to aggregate together and the interfacial surfaces of the particles to adhere to each other, thus decreasing air permeability of the coating layer including the adhesive polymer, and consequently lowering the mobility of lithium ions of a lithium secondary battery, thus resulting in the lithium secondary battery exhibiting poor characteristics.

Accordingly, embodiments of the present disclosure are directed to a separator having improved binding strength and reduced stickiness. In some embodiments of the present disclosure, a separator for a lithium secondary battery includes a porous base and a first coating layer on a surface of the porous base. The first coating layer may include a (meth)acrylic acid ester-based polymer having a glass transition temperature of about 10° C. to about 60° C. The first coating layer may be positioned opposite to a cathode of the lithium secondary battery.

In some embodiments, the (meth)acrylic acid ester-based polymer may have a glass transition temperature of about 20° C. to about 60° C., for example, about 30° C. to about 50° C.

When the (meth)acrylic acid ester-based polymer has a glass transition temperature of less than 10° C., a surface of the coating layer including the (meth)acrylic acid ester-based polymer may become sticky at room temperature, and may cause the separator to stick to itself when the separator is rolled up, thus making it very difficult or impossible to wind the battery assembly including the separator and electrodes in a roll form. When the (meth)acrylic acid ester-based polymer has a glass transition temperature of greater than 60° C., the binding strength between an electrode and the separator may not be strong enough.

In some embodiments of the present disclosure, when the first coating layer of the separator includes the (meth)acrylic acid ester-based polymer having a glass transition temperature within any of the above-defined ranges, the first coating layer will have no or low stickiness at room temperature, and accordingly, the problem of interfacial surfaces of the particles adhering to each other may be preemptively prevented, and the separator will not stick to itself when rolled. In addition, the separator in which the first coating layer includes the (meth)acrylic acid ester-based polymer having a glass transition temperature within any of the above-defined ranges may prevent or reduce a decrease in air permeability of the first coating layer and a decrease in mobility of lithium ions, and thus may improve the binding strength between the electrodes and the separator. The improved adhesion between the electrodes and the separator may facilitate migration of lithium ions at the interface between each of the electrodes and the separator, and may improve a charge-discharge efficiency of the battery. Moreover, such improved adhesion may be maintained even when the battery is used for a long time, thus improving lifetime characteristics of the battery, and may suppress shrinkage of the separator at high temperatures, thus improving thermal stability of the battery.

In some embodiments, the first coating layer of the separator may be positioned opposite to a cathode of the lithium battery.

In some embodiments, the surface of the porous base in the separator may be fully or partially coated with the first coating layer.

In some embodiments, the first coating layer may be on the entire surface of the porous base, and/or may fill some or all pores of the porous base.

In some embodiments, the first coating layer may be a dot-patterned layer including a plurality of dots arranged at regular (e.g., set or predetermined) intervals, and may further improve lithium ion permeability of the separator.

When the first coating layer exhibits a dot-pattern, the pattern may be any suitable array pattern of dots of various shapes and sizes, so long as it does not interfere with the lithium ion transfer of the separator having the first coating layer. For example, the shape of the dots in the dot-patterned first coating layer may be, without limitation, circular, triangular, rectangular, elliptical, fan-like, or diamond-like.

In some embodiments, the dots of the dot-patterned first coating layer may be connected together to form a plurality of connected dots.

FIG. 1 is a sectional schematic view of a first coating layer 12 for a separator according to embodiments of the present disclosure. Referring to FIG. 1, the first coating layer 12 may be formed as a dot-patterned layer and may include a plurality of circular dots arranged at regular (e.g., set or predetermined) intervals.

The dots of the dot-patterned first coating layer may have an average diameter of about 0.1 mm to about 1 mm, may be arranged at an interval of about 0.1 mm to about 10 mm, and may have an average thickness of about 0.3 μm to about 10 μm, in order to facilitate improved binding strength of the separator to a target electrode and mitigate the likelihood of performance degradation of the lithium secondary battery. When the size, interval, and thickness of the dots of the dot-patterned first coating layer are within any of the above ranges, the binding strength of the separator to the electrode may be improved, and the binding strength between the components of the porous dot-patterned first coating layer may also be improved, thus preventing or reducing the risk of detachment of the components of the first coating layer.

As used herein, the term "average diameter" of dots may refer to an average diameter of the dots when the dots are circular, or may also refer to a largest length or side length of the dots when the dots are rectangular. The term "interval", as used herein, may refer to a distance between center points of the adjacent dots.

A total area of the dot-patterned first coating layer may be about 10% to about 70%, for example, about 20% to about 60%, or about 30% to about 50%, based on a total area of the separator. When the total area of the dot-patterned first coating layer is within any of these ranges, the separator may be easily impregnated with an electrolyte, and may have improved adhesion to an electrode.

In some embodiments, the (meth)acrylic acid ester-based polymer may be a polymerization product between an ethylenically unsaturated carboxylic acid ester and a monomer that is copolymerizable (e.g., capable of copolymerization) with the ethylenically unsaturated carboxylic acid ester. As used herein, the term "polymerization" may include cross-linking reactions.

The polymerization product may be prepared via copolymerization by, for example, emulsification polymerization.

Non-limiting examples of the ethylenically unsaturated carboxylic acid ester include acrylic acid alkyl esters and substituted acrylic acid alkyl esters, such as, for example, methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, isobornyl acrylate, hydroxypropyl acrylate, hydroxyethyl acrylate, lauryl acrylate, and/or the like; methacrylic acid alkyl esters and substituted methacrylic acid alkyl esters, such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxypropyl methacrylate, lauryl methacrylate, hydroxyethyl methacrylate, and/or the like; crotonic acid alkyl esters and substituted crotonic acid alkyl esters, such as methyl crotonate, ethyl crotonate, propyl crotonate, butyl crotonate, isobutyl crotonate, n-crotonate amyl, isoamyl crotonate, n-hexyl crotonate, 2-ethylhexyl crotonate, hydroxypropyl crotonate, hydroxyethyl crotonate, and/or the like; amino group-containing methacrylic acid esters, such as dimethylaminoethyl methacrylate, diethylaminoethyl methacrylate, and/or the like; alkoxy group-containing methacrylic acid esters, such as methoxy polyethylene glycol monomethacrylate, and/or the like; and unsaturated dicarboxylic acid monoesters, such as monooctyl maleate, monobutyl maleate, monooctyl itaconate, and/or the like. However, examples of the ethylenically unsaturated carboxylic acid ester are not limited thereto and may include any suitable ethylenically unsaturated carboxylic acid ester known to those skilled in the art.

Non-limiting examples of the monomer that is copolymerizable with the ethylenically unsaturated carboxylic acid ester as listed above include unsaturated carboxylic acids, such as acrylic acid, methacrylic acid, itaconic acid, fumaric acid, and/or the like; carboxylic acid esters having at least one carbon-carbon double bond, such as diethylene glycol dimethacrylate, trimethylolpropane triacrylate, and/or the like; styrene-based monomers, such as styrene, chlorostyrene, vinyl toluene, t-butyl styrene, vinyl benzoic acid, vinyl benzoate, vinyl naphthalene, chloromethyl styrene, hydroxymethyl-styrene, α-methylstyrene, divinylbenzene, and/or the like; amide-based monomers, such as acrylamide, N-methylol acrylamide, acrylamide-2-methylpropane sulfonic acid, and/or the like; α,β-unsaturated nitrile compounds, such as acrylonitrile, methacrylonitrile, and/or the like; olefins, such as ethylene, propylene, and/or the like; diene-based monomers, such as butadiene, isoprene, and/or the like; halogen atom-containing monomers, such as vinyl chloride, vinylidene chloride, and/or the like; vinyl esters, such as vinyl acetate, vinyl propionate, vinyl butyrate, vinyl benzoate, and/or the like; vinyl ethers, such as allyl glycidyl ether, methyl vinyl ether, ethyl vinyl ether, butyl vinyl ether, and/or the like; vinyl ketones, such as methyl vinyl ketone, ethyl vinyl ketone, butyl vinyl ketone, vinyl hexyl ketone, vinyl isopropenyl ketone, and/or the like; heterocyclic vinyl compounds, such as N-vinyl pyrrolidone, vinyl pyridine, vinyl imidazole, and/or the like; and acrylonitrile. However, examples of the monomer that is copolymerizable with the ethylenically unsaturated carboxylic acid ester are not limited thereto and may include any suitable monomer that is copolymerizable with the above-listed ethylenically unsaturated carboxylic acid esters and that is known to those skilled in the art.

For example, the monomer that is copolymerizable with an ethylenically unsaturated carboxylic acid ester may be at least one selected from carboxylic acid esters having at least one carbon-carbon double bond, amide-based monomers, α,β-unsaturated nitrile compounds, and vinyl ethers.

The ethylenically unsaturated carboxylic acid ester and the monomer that is copolymerizable with the ethylenically unsaturated carboxylic acid ester may be mixed at a molar ratio of about 0.1:99.9 to about 99.9:0.1.

In some embodiments, the ethylenically unsaturated carboxylic acid ester may be at least one selected from among 2-ethylhexyl acrylate, methyl acrylate, ethyl acrylate, butyl acrylate, hydroxyethyl acrylate, and isobornyl acrylate.

In some embodiments, the monomer copolymerizable with an ethylenically unsaturated carboxylic acid ester may be at least one selected from among methacrylic acid, acrylic acid, itaconic acid, ethylene dimethacrylate, and acrylonitrile.

The (meth)acrylic acid ester polymer may have a weight average molecular weight of about 10,000 to about 1,000,000, for example, about 60,000 to about 500,000.

In some embodiments, the (meth)acrylic acid ester-based polymer may have a glass transition temperature of about 10° C. to about 60° C., which may be controlled based on the composition of the monomers.

An emulsifier that may be used in the coplymerization by emulsification polymerization may be any suitable emulsifier commonly used in connection with emulsification polymerization.

For example, the emulsifier may be a non-ionic emulsifier and may be selected from among benzene sulfonates, such as sodium dodecylbenzene sulfonate, sodium dodecyl phenyl ether sulfonate, and/or the like; alkyl sulfates, such as sodium lauryl sulfate, sodium tetradodecyl sulfate, and/or the like; sulfosuccinates, such as dioctyl sulfosuccinate, sodium dihexyl sulfosuccinate, and/or the like; fatty acid salts, such as sodium laurate, and/or the like; sodium ethoxy sulfates, such as sodium polyoxyethylene lauryl ether sulfate, sodium polyoxyethylene nonylphenyl ether sulfate, and/or the like; alkane sulphonates; sodium alkyl ether phosphate ester; polyoxyethylene nonylphenyl ether; polyoxyethylene sorbitan lauryl ester; a polyoxyethylene-polyoxypropylene block copolymer; and/or combinations thereof.

The amount of the emulsifier may be in a range of about 0.01 parts to about 10 parts by weight based on 100 parts by weight of a total weight of the monomer. In some embodiments, the emulsifier may be omitted, depending on the polymerization conditions.

A molecular weight control agent may be used in addition to the above-described compounds. Non-limiting examples of the molecular weight control agent include mercaptans, such as t-dodecylmercaptan, n-dodecylmercaptan, n-octyl mercaptan, and/or the like; halogenated hydrocarbons, such as carbon tetrachloride, carbon tetrabromide, and/or the like; terpinolene; and alpha-methyl styrene dimer.

The molecular weight control agent may be added before or during polymerization. The amount of the molecular weight control agent may be in a range of about 0.01 parts to about 10 parts by weight, and in some embodiments, about 0.1 parts to about 5 parts by weight, based on 100 parts by weight of the monomer.

In some embodiments, the molecular weight of the (meth) acrylic acid ester polymer may vary depending on the polymerization temperature and the rate of adding the monomer, and accordingly, the molecular weight control agent may be omitted.

Additionally, a polymerization initiator may be used. The polymerization initiator may be any suitable polymerization initiator commonly used in connection with emulsification polymerization, dispersion polymerization, or suspension polymerization. Non-limiting examples of the polymerization initiator include persulfates, such as potassium persulfate, ammonium persulfate, and/or the like; hydrogen peroxide; and organic peroxides, such as benzoyl peroxide, cumene hydroperoxide, and/or the like. The above-described polymerization initiators may be used alone or in a combination with a redox polymerization initiator, which may include a reducing agent, such as sodium sulfite, sodium thiosulfate, and/or ascorbic acid. For example, the polymerization initiator may be an azo compound, such as 2,2'-azobisisobutyronitrile (AIBN), 2,2'-azobis(2,4-dimethylvaleronitrile), 2,2'-azobis(4-methoxy-2,4-dimethylvaleronitrile), dimethyl-2,2'-azobisisobutyrate, 4,4'-azobis(4-cyanopentanoic acid), and/or the like; an amidine compound, such as 2,2'-azobis(2-amino-di-propane) dihydrochloride, 2,2'-azobis(N,N'-dimethylene isobutyl amidine), 2,2'-azobis(N,N'-dimethylene isobutyl amidine) dihydrochloride, and/or the like; and/or combinations thereof. The amount of the polymerization initiator may be in a range of about 0.01 parts to about 10 parts by weight, and in some embodiments, about 0.1 parts to about 10 parts by weight, or about 0.1 parts to about 5 parts by weight, based on 100 pats by weight of a total weight of the monomer.

Optionally, an anti-aging agent, an anti-staling agent, or an anti-foaming agent may also be added during the copolymerization of the (meth)acrylic acid ester-based polymer.

The (meth)acrylic acid ester-based polymer may be a polymer particle-containing composition, for example, an aqueous emulsion. Herein, aqueous emulsion refers to a dispersion of polymer particles in water.

The polymer particles in the aqueous emulsion may have an average diameter of about 50 nm to about 500 nm, for example, about 200 nm. When the diameter of the polymer particles is within these ranges, a uniform aqueous emulsion may be obtained and aggregation of particles may be prevented or reduced. A solids content of the aqueous emulsion may be in a range of about 10 wt % to about 50 wt %. When the solids content of the aqueous emulsion is within this range, the aqueous emulsion may have improved coating features and emulsion phase stability.

In some embodiments, the (meth)acrylic acid ester-based polymer may be an aqueous emulsion including an acrylic acid ester-based polymer.

In some embodiments, the separator may include a second coating layer on a surface of the porous base opposite to the first coating layer, the second coating layer including a (meth)acrylic acid ester-based polymer.

The second coating layer may be a dot-patterned layer including a plurality of dots arranged at regular (e.g., set or predetermined) intervals. The average diameter, interval at which the dots are arranged, and average thickness of the dots in the second coating layer may be the same or substantially the same as those described in conjunction with the first coating layer.

In some embodiments, the separator may further include an inorganic coating layer including inorganic particles between the porous base and the first coating layer and/or between the porous base and the second coating layer. The inorganic coating layer may prevent or reduce thermal shrinkage of the porous base when the lithium secondary battery is in use.

The porous base may include any suitable porous base material commonly used in connection with electrochemical devices. For example, the porous base may be a membrane or fibrous base including one or at least two of polyethylene terephthalate, polybutylene terephthalate, polyester, polyacetal, polyamide, polycarbonate, polyimide, polyether ether ketone, polyether sulfone, polyphenylene oxide, polyphenylene sulfide, polyvinylidene fluoride, polyethylene oxide, polyacrylonitrile, a polyvinylidene fluoride-hexafluoropropylene copolymer, polyethylene, and polypropylene.

The porous base may have a thickness of about 5 μm to about 20 μm, a pore size of about 0.001 μm to about 0.1 μm, and a porosity of about 10% to about 60%. However, the thickness, pore size, and porosity of the porous base are not limited thereto.

The inorganic particles of the inorganic coating layer may be any suitable inorganic particles known to those skilled in the art. For example, the inorganic particles may be at least one selected from α-alumina (α-$Al_2O_3$), γ-alumina (γ-$Al_2O_3$), boehmite (γ-AlO (OH)), gibbsite (γ-Al(OH)$_3$), colloidal silica, zirconium oxide, magnesium fluoride, $BaTiO_3$, $SnO_2$, $CeO_2$, MgO, NiO, CaO, ZnO, $Y_2O_3$, $TiO_2$, and SiC. The inorganic particles may have an average particle diameter of about 0.1 μm to about 3 μm.

When the average particle diameter of the inorganic particles is within this range, the inorganic coating layer may have a uniform thickness and an appropriate (or desired) porosity.

In some embodiments, the separator may further include a third coating layer including an inorganic particle and a binder between the porous base and the first coating layer and/or between the porous base and the second coating layer.

The binder may include any suitable binder polymer that can be stable in an electrolyte solution and at an operating voltage of a lithium secondary battery. Non-limiting examples of the binder include a (meth)acrylic acid ester-based polymer, polyethylene, polypropylene, an ethylene-propylene copolymer, polyvinyl chloride, polyvinylidene chloride, polystyrene, polyacrylonitrile, polytetrafluoroethylene, polymethyl methacrylate, polyvinyl acetate, polyisoprene, polychloroprene, polyester, polycarbonate, polyamide, polyacrylate, polyurethane, an acrylonitrile-butadiene-styrene terpolymer, polyoxyethylene, polyoxymethylene, polyoxypropylene, a styrene-acrylonitrile copolymer, an acrylonitrile-styrene-acrylate terpolymer, a styrene-butadiene copolymer, an acrylated styrene-butadiene copolymer, an acrylonitrile-butadiene copolymer, an acrylonitrile-butadiene-styrene terpolymer, acrylic rubber, butyl rubber, fluoro rubber, polyvinyl pyrrolidone, polyepichlorohydrin, polyphosphazene, an ethylene-propylene-diene terpolymer, polyvinyl pyridine, chlorosulfonated polyethylene, polysulfone, polyvinyl alcohol, polyvinyl acetate, thermoplastic polyester rubber (PTEE), carboxymethyl cellulose, hydroxypropyl methyl cellulose, hydroxypropyl cellulose, and/or diacetyl cellulose.

For example, the binder may be a polymer particle-containing composition and may include particles of any of the above-listed polymers dispersed in an aqueous solvent. The polymer particle-containing composition may be an aqueous emulsion. The polymer particles in the aqueous emulsion may have an average particle diameter of about 50 nm to about 500 nm, for example, about 120 nm. When the diameter of the polymer particles is within these ranges, the binding strength between the porous base and the coating layer may be improved.

A solids content of the aqueous emulsion for the binder may be in a range of about 20 wt % to about 50%. When the solids content of the aqueous emulsion is within this range, the aqueous emulsion may have improved coating features and emulsion phase stability.

The amount of the inorganic particle in the third coating layer may be in a range of about 1 part to about 20 parts by weight based on 100 parts by weight of the binder. When the amount of the inorganic particle is within this range, shrinking of the separator, which may occur when the internal temperature of the battery rises, may be prevented or reduced, without a substantial decrease in binding strength of the third coating layer to the porous base.

In some embodiments, the separator may have a thickness of about 10 μm to about 25 μm, and in some other embodiments, about 16 μm to about 22 μm. When the thickness of the separator is within any of these ranges, the separator may effectively separate the anode and the cathode from one another and may prevent or reduce the risk of a short circuit between the anode and the cathode, thus improving the capacity of the lithium secondary battery.

Hereinafter, a method of manufacturing a separator according to embodiments of the present disclosure will be described.

A first composition including a (meth)acrylic acid ester-based polymer having a glass transition temperature of about 10° C. to about 60° C. may be coated on a surface of a porous base, and then dried to form a first coating layer. The first coating layer of the separator may be positioned opposite to a cathode of a lithium secondary battery. The drying may be performed at a temperature of about 20° C. to about 85° C.

The first composition including the (meth)acrylic acid ester-based polymer may be an aqueous emulsion of the (meth)acrylic acid ester-based polymer, and may further include a solvent, in addition to the aqueous emulsion. Non-limiting examples of the solvent include water, acetone, tetrahydrofuran, methylene chloride, chloroform, dimethylformamide, N-methyl-2-pyrrolidone, cyclohexane, and/or mixtures thereof.

A second composition including a (meth)acrylic acid ester-based polymer may be coated on a surface of the porous base opposite to the first coating layer in the same manner as described in conjunction with the first coating layer to form a second coating layer.

The first coating layer and the second coating layer may each be formed as a dot-patterned layer. When the first coating layer and the second coating layer are formed as dot-patterned layers, ion permeability of the separator and characteristics of the lithium secondary battery may be improved.

An inorganic particle-containing composition may be coated between the porous base and the first coating layer and/or between the porous base and the second coating layer, and then dried to form an inorganic coating layer. The drying may be performed at a temperature of about 20° C. to about 85° C.

The inorganic coating layer may be formed by coating the composition including an inorganic particle by, for example, micro gravure coating or dip coating, to have a dry thickness of about 3 μm to about 4 μm.

An inorganic particle- and binder polymer-containing composition may be further coated between the porous base and the first coating layer and/or between the porous base and the second coating layer, and then dried to form a third coating layer.

The inorganic particle-containing composition for the inorganic coating layer, and the inorganic particle- and binder polymer-containing composition for the third coating layer may each further include a solvent. Non-limiting examples of the solvent include acetone, tetrahydrofuran, methylene chloride, chloroform, dimethylformamide, N-methyl-2-pyrrolidone, cyclohexane, water, and/or mixtures thereof.

In preparing the inorganic particle- and binder polymer-containing composition, after the inorganic particles have been added to a binder polymer-containing solution, the inorganic particles may be ground. The amount of time for grinding the inorganic particles may be from about 1 hour to about 20 hours. The ground inorganic particles may have a particle diameter of about 0.1 μm to about 3 μm, as described above. The grinding may be performed using any suitable method, for example, ball milling.

The coating of the first coating layer, the second coating layer, and the third coating layer may be performed using any suitable coating method known to those skilled in the art, for example, dip coating, die coating, roll coating, comma coating, gravure coating, and/or a combination thereof.

The method for forming the first coating layer and the second coating layer as dot-patterned layers may include, for example, respectively coating the first composition and the second composition using a gravure roll having a dot pattern, and then drying the same. The drying may be performed at a temperature of about 20° C. to about 85° C.

Hereinafter, a method of manufacturing a lithium secondary battery including any one of the separators according to the above-described embodiments, will be described.

First, an anode active material, a conducting agent, a binder, and a solvent may be mixed to prepare an anode active material layer composition. The anode active material layer composition may be directly coated on a metallic current collector and dried to form an anode.

Alternatively, the anode active material layer composition may be cast on a separate supporting structure to form an anode active material layer, which may then be separated from the supporting structure and laminated on a metallic current collector to form an anode. However, the anode is not limited to the examples described above, and may be selected from a variety of suitable forms and types.

In some embodiments, the anode active material may be a non-carbonaceous material. For example, the anode active material may include at least one selected from a metal that is alloyable (i.e. capable of forming an alloy) with lithium, an alloy of the metal that is alloyable with lithium, and an oxide of the metal that is alloyable with lithium.

Non-limiting examples of the metal alloyable with lithium include Si, Sn, Al, Ge, Pb, Bi, Sb, a Si—Y alloy (where Y is an alkali metal, an alkali earth metal, a Group 14 to 16 element, a transition metal, a rare earth element, and/or a combination thereof, and Y is not Si), and a Sn—Y alloy (where Y is an alkali metal, an alkali earth metal, a Group 13 to 16 element, a transition metal, a rare earth element, and/or a combination thereof, and Y is not Sn). Y may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and/or combinations thereof.

When the metal that is alloyable with lithium is a transition metal, non-limiting examples of the oxide of the metal that is alloyable with lithium include lithium titanium oxide, vanadium oxide, and lithium vanadium oxide.

When the metal that is alloyable with lithium is a non-transition metal, non-limiting examples of the oxide of the metal that is alloyable with lithium include $SnO_2$ and $SiO_x$ (where $0<x<2$).

For example, the anode active material may be at least one selected from Si, Sn, Pb, Ge, Al, $SiO_x$ (where $0<x\leq2$), $SnO_y$ (where $0<y\leq2$), $Li_4Ti_5O_{12}$, $TiO_2$, $LiTiO_3$, and $Li_2Ti_3O_7$, but is not limited thereto. In some embodiments, the anode active material may be any suitable non-carbonaceous anode active material.

In some embodiments, the anode active material may be a composite of a non-carbonaceous anode active material as described above and a carbonaceous material. In some embodiments, the anode active material may further include a carbonaceous anode active material, in addition to a non-carbonaceous anode active material as described above.

Non-limiting examples of the carbonaceous material include crystalline carbon, amorphous carbon, and/or mixtures thereof. Non-limiting examples of the crystalline carbon include graphite, such as natural graphite or artificial graphite that either do not have a shape or have a plate, flake, spherical or fibrous form. Non-limiting examples of the amorphous carbon include soft carbon (i.e. carbon sintered at low temperatures), hard carbon, mesophase pitch carbides, sintered corks, and/or the like.

Non-limiting examples of the conducting agent include acetylene black, ketjen black, natural graphite, artificial graphite, carbon black, carbon fiber, and metal powder and metal fiber of, for example, copper, nickel, aluminum and/or silver. In some embodiments, a conducting material such as, for example, polyphenylene derivative may be used in combination with at least one other conducting material. However, the conducting agent is not limited thereto, and any suitable conducting agent known to those skilled in the art may be used. In some embodiments, any of the above-described crystalline carbonaceous materials may be included as the conducting agent.

Non-limiting examples of the binder include a vinylidene fluoride-hexafluoropropylene copolymer, polyvinylidene fluoride (PVDF), polyacrylonitrile, polymethylmethacrylate, polytetrafluoroethylene, mixtures thereof, and/or a styrene butadiene rubber polymer. However, any suitable binding agent known to those skilled in the art may be used.

Non-limiting examples of the solvent include N-methyl-pyrrolidone, acetone, and water. However, any suitable solvent known to those skilled in the art may be used.

The respective amounts of the anode active material, the conducting agent, the binder, and the solvent may be those generally used in connection with lithium secondary batteries. At least one of the conducting agent, the binder and the solvent may be omitted, depending on the use and the structure of the lithium secondary battery.

Next, a cathode active material, a conducting agent, a binder, and a solvent may be mixed to prepare a cathode active material layer composition. The cathode active material layer composition may be directly coated on a metallic current collector and dried to form a cathode. Alternatively, the cathode active material layer composition may be coated on a separate supporting structure to form a cathode active material layer, which may then be separated from the supporting structure and laminated on a metallic current collector to form a cathode.

The cathode active material may be at least one selected from lithium cobalt oxide, lithium nickel cobalt manganese oxide, lithium nickel cobalt aluminum oxide, lithium iron phosphorous oxide, and lithium manganese oxide, but is not limited thereto. In some embodiments, any suitable cathode active material may be used.

For example, the cathode active material may be a compound represented by one of the following formulae: $Li_aA_{1-b}B_bD_2$ (where $0.90\leq a\leq1.8$, and $0\leq b\leq0.5$); $Li_aE_{1-b}B_bO_{2-c}D_c$ (where $0.90\leq a\leq1.8$, $0\leq b\leq0.5$, and $0\leq c\leq0.05$); $LiE_{2-b}B_bO_{4-c}D_c$ (where $0\leq b\leq0.5$, and $0\leq c\leq0.05$); $Li_aNi_{1-b-c}Co_bB_cD_\alpha$ (where $0.90\leq a\leq1.8$, $0\leq b\leq0.5$, $0\leq c\leq0.05$, and $0<\alpha\leq2$); $Li_aNi_{1-b-c}Co_bB_cO_{2-\alpha}F_\alpha$ (where $0.90\leq a\leq1.8$, $0\leq b\leq0.5$, $0\leq c\leq0.05$, and $0<\alpha<2$); $Li_aNi_{1-b-c}Co_bB_cO_{2-\alpha}F_\alpha$ (where $0.90\leq a\leq1.8$, $0\leq b\leq0.5$, $0\leq c\leq0.05$, and $0<\alpha<2$); $Li_aNi_{1-b-c}Mn_bB_cD_\alpha$ (where $0.90\leq a\leq1.8$, $0\leq b\leq0.5$, $0\leq c\leq0.05$, and $0<\alpha\leq2$); $Li_aNi_{1-b-c}Mn_bB_cO_{2-\alpha}F_\alpha$ (where $0.90\leq a\leq1.8$, $0\leq b\leq0.5$, $0\leq c\leq0.05$, and $0<\alpha<2$); $Li_aNi_{1-b-c}Mn_bB_cO_{2-\alpha}F_\alpha$ (where $0.90\leq a\leq1.8$, $0\leq b\leq0.0.5$, $0\leq c\leq0.05$, and $0<\alpha<2$); $Li_aNi_bE_cG_dO_2$ (where $0.90\leq a\leq1.8$, $0\leq b\leq0.9$, $0\leq c\leq0.5$, and $0.001\leq d\leq0.1$); $Li_aNi_bCo_cMn_dG_eO_2$ (where $0.90\leq a\leq1.8$, $0\leq b\leq0.9$, $0\leq c\leq0.5$, $0\leq d\leq0.5$, and $0.001\leq e\leq0.1$); $Li_aNiG_bO_2$ (where $0.90\leq a\leq1.8$, and $0.001\leq b\leq0.1$); $Li_aCoG_bO_2$ (where $0.90\leq a\leq1.8$, and $0.001\leq b\leq0.1$); $Li_aMnG_bO_2$ (where 0.90≤a≤1.8, and 0.001≤b≤0.1); $Li_aMn_2G_bO_4$ (where 0.90≤a≤1.8, and 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where 0≤f≤2); $Li_{(3-f)}Fe_2(PO_4)_3$ (where 0≤f≤2); and $LiFePO_4$.

In the above formulae, A is selected from nickel (Ni), cobalt (Co), manganese (Mn), and combinations thereof; B is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from cobalt (Co), manganese (Mn), and combinations thereof; F is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.

Any of the compounds listed above as cathode active materials may further include a surface coating layer (hereinafter, "coating layer"). In some embodiments, a mixture of a compound without the coating layer and a compound with the coating layer may be used, where the compounds are selected from those listed above. The coating layer may include at least one selected from an oxide of a coating element, a hydroxide of a coating element, an oxyhydroxide of a coating element, an oxycarbonate of a coating element, and a hydroxycarbonate of a coating element. The compounds included in the coating layer may be amorphous or crystalline. Non-limiting examples of the coating element may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), and/or mixtures thereof. The coating layer may be formed using any suitable method, so long as it does not adversely affect the physical properties of the cathode active material. For example, the coating layer may be formed using a spray coating method, a dipping method, and/or the like. These methods should be apparent to those of ordinary skill in the art, and thus a detailed description thereof will not be provided herein.

For example, the cathode active material may be $LiNiO_2$, $LiCoO_2$, $LiMn_xO_{2x}$ (where x is 1 or 2), $LiNi_{1-x}Mn_xO_2$ (where 0<x<1), $LiNi_{1-x-y}Co_xMn_yO_2$ (where 0≤x≤0.5 and 0≤y≤0.5), $LiFeO_2$, $V_2O_5$, TiS, MoS, or the like.

The conducting agent, binder, and solvent for the cathode active material layer composition may be the same or substantially the same as those described above in connection with the anode active material layer composition. In some embodiments, a plasticizer may be further added to the cathode active material layer composition and/or to the anode active material layer composition, in order to facilitate the formation of pores in the electrode plates.

The respective amounts of the cathode active material, the conducting agent, the binder, and the solvent may be those generally used in connection with lithium secondary batteries. At least one of the conducting agent, the binder and the solvent may be omitted, depending on the use and the structure of the lithium secondary battery.

Next, a separator according to any of the above-descried embodiments is positioned between the cathode and the anode.

Next, an electrolyte is prepared.

In some embodiments, the electrolyte may be an organic electrolyte solution.

Alternately, the electrolyte may be a solid electrolyte. Non-limiting examples of the solid electrolyte include boron oxide and lithium oxynitride. However, any suitable solid electrolyte may be used. The solid electrolyte may be formed on the anode by, for example, sputtering.

In some embodiments, the organic electrolyte solution may be prepared by dissolving a lithium salt in an organic solvent.

The organic solvent may be any suitable organic solvent known to those skilled in the art. Non-limiting examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, α-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and/or mixtures thereof.

The lithium salt may be any suitable lithium salt known to those skilled in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, and/or a mixture thereof.

Figure 2:
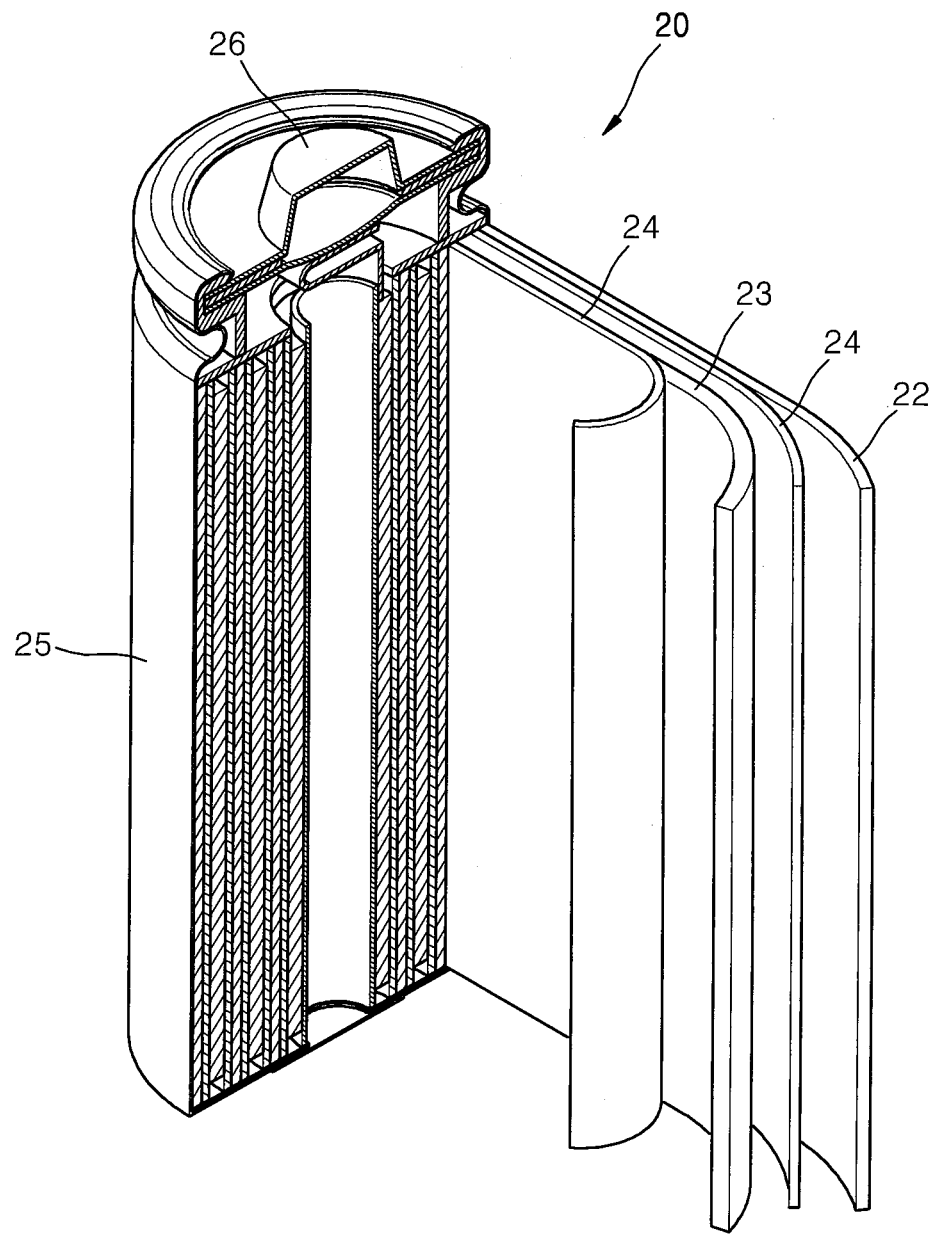
FIG. 2 is a schematic perspective view of a lithium secondary battery according to some embodiments of the present disclosure.

FIG. 2 is a schematic perspective view of a structure of a lithium secondary battery 20 according to an embodiment of the present disclosure.

Referring to FIG. 2, the lithium secondary battery 20 includes a cathode 23, an anode 22, and a separator 24. The cathode 23, the anode 22, and the separator 24 are wound or folded, and then sealed in a battery case 25. Then, the battery case 25 is filled with an organic electrolyte solution and sealed with a cap assembly 26, thereby completing the manufacture of the lithium secondary battery 20. The battery case 25 may be a cylindrical case, a rectangular case, or a thin-film kind. In some embodiments, the lithium secondary battery 20 may be a thin film battery. In some embodiments, the lithium secondary battery 20 may be a lithium ion battery. In some embodiments, the lithium secondary battery 20 may be a lithium polymer battery.

The separator 24 may be positioned between the cathode 23 and the anode 22 to form an electrode assembly. The electrode assembly may be rolled up or stacked, and then may be heat-pressed (or thermally compressed) at a temperature of about 80° C. to about 120° C., and in some embodiments, at a temperature of about 100° C. to about 120° C.

When the temperature of the thermal compression is within any of these ranges, the binding strength between the separator and the electrodes may be improved.

In some embodiments, instead of rolling up the electrode assembly, the separator and the electrodes may be laminated or stacked one upon another and then may be folded.

Next, the heat-pressed electrode assembly may be impregnated with an organic electrolyte, and then placed into a pouch (e.g., a battery case 25) and vacuum-sealed, thereby completing the manufacture of the lithium secondary battery 20.

In some embodiments, a plurality of battery assemblies may be stacked one upon another to form a battery pack, which may be used for a device that operates at high temperatures and requires high output, such as, for example, a laptop computer, a smart phone, an electric vehicle, and/or the like.

The lithium secondary battery 20 according to embodiments of the present disclosure may have improved high rate characteristics and improved lifetime characteristics, and thus may be suitable for use in electric vehicles (EVs), for example, in a hybrid vehicle such as a plug-in hybrid electric vehicle (PHEV).

Thereinafter, one or more embodiments of the present disclosure will be described in detail with reference to the following examples. However, these examples are provided for illustrative purposes only, and are not intended to limit the scope of the present disclosure.

Preparation Example 1: Preparation of Acrylic Acid Ester-Based Polymer Emulsion

After a flask reactor equipped with a condenser, a thermometer, a monomer emulsion inlet, a nitrogen gas inlet, and a stirrer was purged with nitrogen gas, 40 parts by weight of deionized water and 1.5 parts by weight of sodium dodecylbenzene sulfonate were added into the flask reactor, and temperature was raised to about 70° C. Next, 40 parts by weight of soft water, and 10 wt % of a monomer emulsion solution having the composition as stated in Table 1 were added into the reactor and stirred for about 5 minutes, and then 10 parts by weight of a 5 wt % aqueous solution of ammonium persulfate was added into the reactor to initiate reaction. After the reaction has proceeded for 1 hour, the remaining monomer emulsion solution, along with 6 parts by weight of the 5 wt % aqueous solution of ammonium persulfate, was dropwise added into the reactor for about 3 hours. After the dropwise addition of the monomer emulsion solution was completed, the reaction mixture was allowed to further react for about 2 hours, to reach a polymerization conversion rate of about 98.2%.

Next, the reaction mixture was cooled down to about 20° C., and the remaining monomer was removed from the reaction mixture under a reduced pressure, followed by a pH adjustment to about 8 and a solids content adjustment to about 40 wt %, thus obtaining an acrylic acid ester-based polymer aqueous emulsion A-1.

The acrylic acid ester-based polymer particles in the acrylic acid ester-based polymer aqueous emulsion A-1 had an average particle diameter of about 120 nm and a weight average molecular weight of about 400,000.

Preparation Example 2: Preparation of Acrylic Acid Ester-Based Polymer Emulsion

Acrylic acid ester-based polymer aqueous emulsion A-2 was obtained in the same or substantially the same manner as in Preparation Example 1, except that the composition of the monomer emulsion solution was varied as stated in Table 1.

The acrylic acid ester-based polymer particles in the acrylic acid ester-based polymer aqueous emulsion A-2 had an average particle diameter of about 130 nm and a weight average molecular weight of about 450,000.

Preparation Example 3: Preparation of Acrylic Acid Ester-Based Polymer Emulsion

Acrylic acid ester-based polymer aqueous emulsion A-3 was obtained in the same or substantially the same manner as in Preparation Example 1, except that the composition of the monomer emulsion solution was varied as stated in Table 1.

The acrylic acid ester-based polymer particles in the acrylic acid ester-based polymer aqueous emulsion A-3 had an average particle diameter of about 130 nm and a weight average molecular weight of about 400,000.

Comparative Preparation Examples 1 and 2: Preparation of Comparative Acrylic Acid Ester-Based Polymer Emulsions Acrylic acid ester-based polymer aqueous emulsions B-1 and B-2 were obtained in the same or substantially the same manner as in Preparation Example 1, except that the composition of the monomer emulsion solution was varied as stated in Table 1.

The acrylic acid ester-based polymer particles in both of the acrylic acid ester-based polymer aqueous emulsions B-1 and B-2 had an average particle diameter of about 150 nm and a weight average molecular weight of about 350,000.

The amounts of the components in Table 1 are represented in parts by weight.

TABLE 1

| Composition | Preparation Examples 1 to 3 | | | Comparative Examples 1 and 2 | |
|---|---|---|---|---|---|
| | A-1 | A-2 | A-3 | B-1 | B-2 |
| Deionized water | 40 | 40 | 40 | 40 | 40 |
| Sodium dodecylbenzene sulfonate | 0.5 | 0.5 | 0.5 | 0.5 | 0.5 |
| 2-Ethylhexyl acrylate | 30 | 20 | | 10 | |
| Methyl acrylate | | | 43 | | 53 |
| Ethyl acrylate | | | 37.5 | | |
| Butyl acrylate | | | | | 27.5 |
| Acrylonitrile | 15 | 15 | 15 | 15 | 15 |
| Isobornyl acrylate | 50 | 60 | | 70 | |
| Methacrylic acid | 1 | 1 | 1 | 1 | 1 |
| Acrylic acid | 1.5 | 1.5 | 1 | 1.5 | 1 |
| Hydroxyethyl acrylate | 1.5 | 2 | 2 | 1.5 | 2 |
| Ethylene dimethacrylate | 1 | 0.5 | 0.5 | 1 | 0.5 |

Example 1: Manufacture of Separator

The acrylic acid ester-based polymer aqueous emulsion A-1 of Preparation Example 1 was coated on a first surface of a porous polyethylene membrane (having a porosity of about 45%) using a gravure coater to have a thickness of about of about 18 μm before drying and about 1.0 μm after drying, and then was further dried at about 80° C., thereby forming a first coating layer. Next, the acrylic acid ester-based polymer aqueous emulsion A-1 was coated on a second surface of the porous polyethylene membrane using a gravure coater to have a thickness of about 1.0 μm after drying, and then was further dried at about 80° C., thereby forming a second coating layer and completing the manufacture of a separator.

The first coating layer and the second coating layer were each formed as dot-patterned layers having an average dot diameter of about 0.25 mm, an interval between the dots of about 0.15 mm, and an average dot thickness of about 1 μm.

A total area of the dot-patterned first and second coating layers was about 46% of a total area of the separator.

Examples 2 and 3: Manufacture of Separators

Separators of Examples 2 and 3 were each manufactured in the same or substantially the same manner as in Example 1, except that the acrylic acid ester-based polymer aqueous emulsions A-2 and A-3 of Preparation Examples 2 and 3 were used, respectively, instead of the acrylic acid ester-based polymer aqueous emulsion A-1 of Preparation Example 1.

Comparative Examples 1 and 2: Manufacture of Separators

Separators of Comparative Examples 1 and 2 were each manufactured in the same or substantially the same manner as in Example 1, except that the acrylic acid ester-based polymer aqueous emulsions B-1 and B-2 of Comparative Preparation Examples 1 and 2 were used, respectively, instead of the acrylic acid ester-based polymer aqueous emulsion A-1 of Preparation Example 1.

Manufacture Example 1: Manufacture of Lithium Secondary Battery $LiCoO_2$ as a cathode active material, polyvinylidene fluoride (PVDF) as a binder, and carbon as a conducting agent were mixed in a ratio of about 92:4:4 by weight, and then dispersed in N-methyl-2-pyrrolidone to prepare a cathode slurry. The cathode slurry was coated on an aluminum foil having a thickness of about 20 μm, dried, and then roll-pressed to obtain a cathode.

Artificial graphite as an anode active material, styrene-butadiene rubber as a binder, and carboxymethylcellulose as a thickening agent were mixed in a ratio of about 96:2:2 by weight, and then dispersed in water to prepare an anode active material slurry. The anode active material slurry was coated on a copper foil having a thickness of 15 μm, dried, and then roll-pressed to manufacture an anode.

The cathode, anode, and separator of Example 1 were assembled to form a stacked cell, which was then heat-pressed at about 90° C. at a pressure of about 200 kgf for about 40 seconds to bind the cathode, anode, and separator together.

The heat-pressed cell was placed into a pouch, and a mixed electrolyte solution including ethylene carbonate (EC), ethylmethylcarbonate (EMC), and diethylcarbonace (DEC) in a ratio of about 3:5:2 by volume and 1.3M of $LiPF_6$, was injected into the pouch, which was then vacuum-sealed, thereby manufacturing a lithium secondary battery.

Manufacture Examples 2 and 3: Manufacture of Lithium Secondary Batteries

Lithium secondary batteries of Manufacture Examples 2 and 3 were each manufactured in the same or substantially the same manner as in Manufacture Example 1, except that the separators of Examples 2 and 3 were used, respectively, instead of the separator of Example 1.

Comparative Manufacture Examples 1 and 2: Manufacture of Lithium Secondary Batteries Lithium secondary batteries of Comparative Manufacture Examples 1 and 2 were each manufactured in the same or substantially the same manner as in Manufacture Example 1, except that the separators of Comparative Examples 1 and 2 were used, respectively, instead of the separator of Example 1.

Evaluation Example 1: Glass Transition Temperature Measurement

Glass transition temperatures of each of the acrylic acid ester-based polymers in the acrylic acid ester-based polymer aqueous emulsions of Preparation Examples 1 to 3 and Comparative Preparation Examples 1 and 2 were measured using differential scanning calorimetry.

The measurement results are shown in Table 2.

TABLE 2

| Example | Glass transition temperature (° C.) |
|---|---|
| Preparation Example 1 | 20 |
| Preparation Example 2 | 40 |
| Preparation Example 3 | 11 |
| Comparative Preparation Example 1 | 65 |
| Comparative Preparation Example 2 | 0 |

Evaluation Example 2: Evaluation of Binding Strength Between Separator and Electrode A 180° peel strength test was performed on each of the lithium secondary batteries of Manufacture Examples 1 to 3 and Comparative Manufacture Examples 1 and 2, including the separators of Examples 1 to 3 and Comparative Examples 1 and 2, respectively, by using a universal testing machine (UTM) to evaluate the binding strength between the separator and the electrodes in each of the lithium secondary batteries.

The results of the peel strength test are shown in Table 3.

TABLE 3

| Example | Peel strength (N/mm) |
|---|---|
| Manufacture Example 1 | 0.11 |
| Manufacture Example 2 | 0.10 |
| Manufacture Example 3 | 0.13 |
| Comparative Manufacture Example 1 | 0.02 |
| Comparative Manufacture Example2 | 0.09 |

Referring to Table 3, the lithium secondary batteries of Manufacture Examples 1 to 3 were found to have significantly better binding strength between the separator and the electrode, compared to the lithium secondary batteries of Comparative Manufacture Examples 1 and 2.

Evaluation Example 3: Evaluation of Separator's Stickiness

Two separators manufactured according to each of Examples 1 to 3 and Comparative Examples 1 and 2 were stacked one upon another, and then pressed together at a pressure of about 200 kgf using a press for about 40 seconds. A 180° peel strength test using a UTM was then performed to evaluate the stickiness between the two separators in each set. The results are shown in Table 4.

TABLE 4

| Example | Peel strength (N/mm) |
| --- | --- |
| Example 1 | 0.005 |
| Example 2 | 0.001 |
| Example 3 | 0.008 |
| Comparative Example 1 | 0.001 |
| Comparative Example 2 | 0.11 |

Referring to Table 4, the sets of two separators of Examples 1 and 2 were found to have smaller peel strengths, compared to the set of separators of Comparative Example 2, and accordingly, to be less sticky. Although the set of separators of Comparative Example 1 had relatively low stickiness, it was found to be unsatisfactory due to the weak binding strength of the separator to the electrode, as supported by the results of Evaluation Example 2 illustrated in Table 2.

Evaluation Example 4: Evaluation of Charge-Discharge Characteristics

The lithium secondary batteries of Manufacture Examples 1 to 3 and Comparative Manufacture Examples 1 and 2, each manufactured as a pouched cell using the separators of Examples 1 to 3 and Comparative Examples 1 and 2, respectively, were each charged with a constant current of 0.2 C rate at about 25° C. to a voltage of about 4.2V, and then with a constant voltage of about 4.2V to a current of about 0.01 C, followed by discharging with a constant current of 0.2 C to a voltage of 3.05V (formation process).

After the formation process, each of the lithium secondary batteries was charged with a constant current of 0.5 C rate at about 25° C. to a voltage of about 4.2V, and then with a constant voltage of about 4.2V to a current of about 0.01 C, followed by discharging with a constant current of about 0.5 C to a voltage of about 3.0V. This cycle of charging and discharging was repeated 30 times.

The results of the charge-discharge test are shown in Table 5.

A charge-discharge efficiency at the 1st cycle was calculated using Equation 1, and a capacity retention rate was calculated using Equation 2.

$$\text{Charge-discharge efficiency} = (\text{Discharge capacity at } 1^{st} \text{ cycle} / \text{Charge capacity at } 1^{st} \text{ cycle}) \times 100 \quad \text{Equation 1}$$

$$\text{Capacity retention rate} = (\text{Discharge capacity at } 30^{th} \text{ cycle} / \text{Discharge capacity at } 1^{st} \text{ cycle}) \times 100 \quad \text{Equation 2}$$

TABLE 5

| Example | Charge-discharge efficiency (%) | Capacity retention rate (%) |
| --- | --- | --- |
| Manufacture Example 1 | 98.3 | 95 |
| Manufacture Example 2 | 98.3 | 94 |
| Manufacture Example 3 | 98.2 | 95 |
| Comparative Manufacture Example 1 | 98.1 | 91 |
| Comparative Manufacture Example 2 | 98.2 | 94 |

Referring to Table 5, the lithium secondary batteries of Manufacture Examples 1 to 3 were found to have improved capacity retention rate and charge-discharge efficiency characteristics, compared to the lithium secondary battery of Comparative Manufacture Example 1. Although the lithium secondary battery of Comparative Manufacture Example 2 showed satisfactory capacity retention rate and charge-discharge efficiency characteristics, the separator thereof had significantly higher stickiness (as described in Evaluation Example 2) than the separators of the lithium secondary batteries of Manufacture Examples 1 to 3.

According to one or more embodiments of the present disclosure, a separator for a lithium secondary battery may have improved binding strength to an electrode, and a surface of the separator may have little or no stickiness, and thus migration of lithium ions at the interface between the electrode and the separator may be facilitated and the charge-discharge efficiency of the battery may be improved. A lithium secondary battery including the separator may maintain the binding strength between the separator and the electrode even when the battery is used for a long time, and thus may have improved lifetime characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims, and equivalents thereof.

What is claimed is:

1. A separator for a lithium secondary battery, the separator comprising:
    a porous base, at least a portion of the porous base comprising at least one selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyvinylidene fluoride, polyethylene oxide, polyacrylonitrile, a polyvinylidene fluoride-hexafluoropropylene copolymer, polyethylene, and polypropylene; and
    a first coating layer directly on a surface of the portion of the porous base and a second coating layer on a surface of the porous base opposite to the first coating layer, the first coating layer and the second coating layer each comprising a (meth)acrylic acid ester-based polymer having a glass transition temperature of about 10° C. to about 60° C.,
    wherein the (meth)acrylic acid ester-based polymer is a polymerization product of an ethylenically unsaturated carboxylic acid ester and a monomer that is copolymerizable with the ethylenically unsaturated carboxylic acid ester,
    wherein the ethylenically unsaturated carboxylic acid ester is a mixture of 2-ethylhexyl acrylate, isobornyl acrylate, and hydroxyethyl acrylate, or a mixture of methyl acrylate, ethyl acrylate, and hydroxyethyl acrylate, and
    the monomer that is copolymerizable with the ethylenically unsaturated carboxylic acid ester is a mixture of acrylonitrile, methacrylic acid, acrylic acid, and ethylene dimethacrylate.

2. The separator of claim 1, wherein the first coating layer is opposite to a cathode of the lithium secondary battery.

3. The separator of claim 1, wherein the (meth)acrylic acid ester-based polymer has a glass transition temperature of about 20° C. to about 60° C.

4. The separator of claim 1, wherein the first coating layer is a dot-patterned layer comprising a plurality of dots arranged at intervals.

5. The separator of claim 4, wherein the plurality of dots have an average diameter of about 0.1 mm to about 1 mm and an average thickness of about 0.3 μm to about 10 μm, and at least one of the intervals between the dots is about 0.1 mm to about 10 mm.

6. The separator of claim 1, wherein the second coating layer is a dot-patterned layer comprising a plurality of dots arranged at intervals.

7. The separator of claim 6, wherein the plurality of dots have an average diameter of about 0.1 mm to about 1 mm and an average thickness of about 0.3 μm to about 10 μm, and at least one of the intervals between the dots is about 0.1 mm to about 10 mm.

8. The separator of claim 1, further comprising an inorganic coating layer between the porous base and the second coating layer, the inorganic coating layer comprising inorganic particles of at least one selected from the group consisting of colloidal silica, α-alumina (α-$Al_2O_3$), γ-alumina (γ-$Al_2O_3$), boehmite (γ-AlO (OH)), gibbsite (γ-Al $(OH)_3$), zirconium oxide, magnesium fluoride, $BaTiO_3$, $SnO_2$, $CeO_2$, MgO, NiO, CaO, ZnO, $Y_2O_3$, $TiO_2$, SiC, and combinations thereof.

9. The separator of claim 1, wherein the first coating layer and the second coating layer comprise the same (meth)acrylic acid ester-based polymer.

10. A lithium secondary battery comprising:
a cathode;
an anode; and
the separator of claim 1 between the cathode and the anode.

11. A method of manufacturing a lithium secondary battery, the method comprising:
forming a battery assembly comprising a cathode, an anode, and the separator of claim 1, the separator comprising:
the porous base, at least a portion of the porous base comprising at least one selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyvinylidene fluoride, polyethylene oxide, polyacrylonitrile, a polyvinylidene fluoride-hexafluoropropylene copolymer, polyethylene, and polypropylene,
the first coating layer directly on the surface of the portion of the porous base and the second coating layer on the surface of the porous base opposite to the first coating layer, the first coating layer and the second coating layer each comprising the (meth)acrylic acid ester-based polymer having a glass transition temperature of about 10° C. to about 60° C.,
wherein the (meth)acrylic acid ester-based polymer is a polymerization product of an ethylenically unsaturated carboxylic acid ester and a monomer that is copolymerizable with the ethylenically unsaturated carboxylic acid ester,
wherein the ethylenically unsaturated carboxylic acid ester is a mixture of 2-ethylhexyl acrylate, isobornyl acrylate, and hydroxyethyl acrylate, or a mixture of methyl acrylate, ethyl acrylate, and hydroxyethyl acrylate, and
the monomer that is copolymerizable with the ethylenically unsaturated carboxylic acid ester is a mixture of acrylonitrile, methacrylic acid, acrylic acid, and ethylene dimethacrylate;
rolling up or stacking the battery assembly to obtain a rolled or stacked battery assembly, and heat-pressing the rolled or stacked battery assembly at a temperature of about 80° C. to about 120° C. to obtain a combined battery assembly; and
impregnating the combined battery assembly with an electrolyte.

12. The method of claim 11, wherein the separator is obtained by coating an aqueous emulsion comprising the (meth)acrylic acid ester-based polymer on the two surfaces of the porous base and drying the coated (meth)acrylic acid ester-based polymer.

* * * * *